May 22, 1951 — N. SANDBERG — 2,554,061
GRAIN DRILL DEPTH CONTROL
Filed Oct. 1, 1947
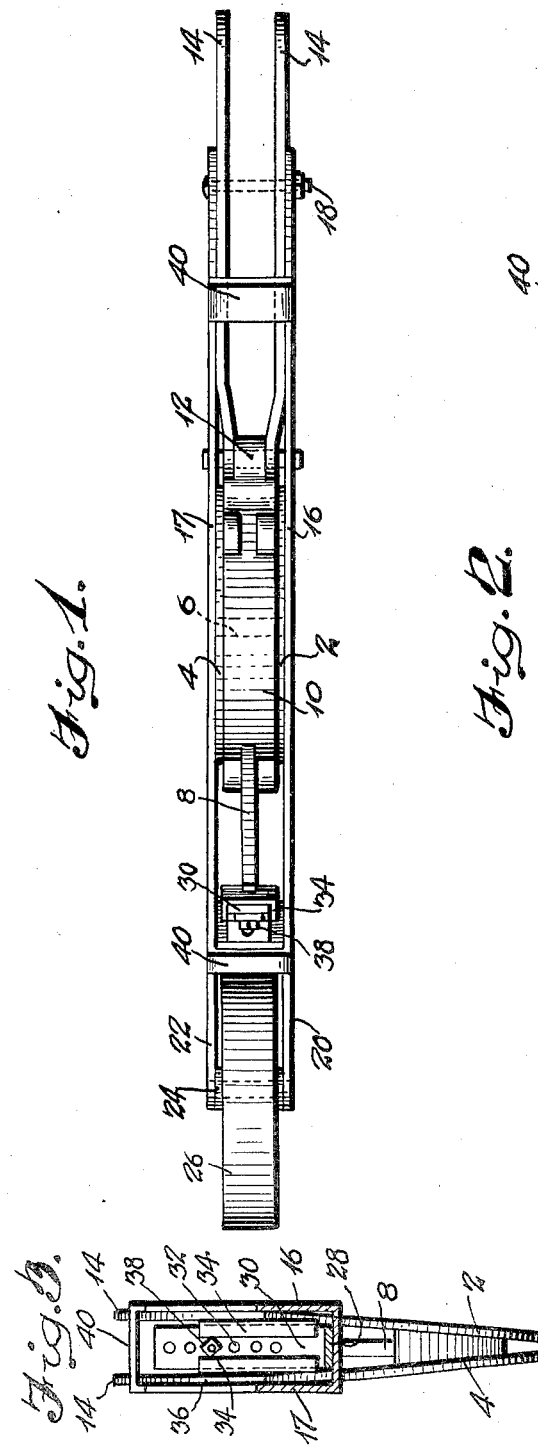
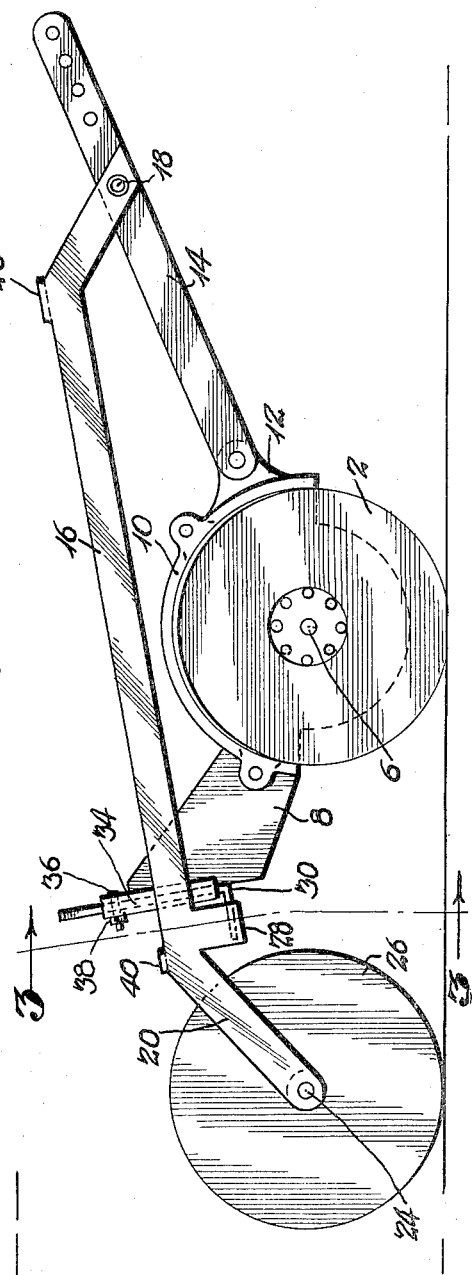
INVENTOR.
Nels Sandberg.
BY Victor J. Evans & Co.
ATTORNEYS Patented May 22, 1951

2,554,061

UNITED STATES PATENT OFFICE 2,554,061

GRAIN DRILL DEPTH CONTROL

Nels Sandberg, Alamo, N. Dak.

Application October 1, 1947, Serial No. 777,185

1 Claim. (Cl. 111—85)

My present invention relates to an improved grain drill depth control and is designed especially for use with existing conventional grain drills so that the depth of the planted seed may be accurately set after adjustment to meet varying conditions as to type of seed and soil conditions.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Figure 1 is a top plan view of the devise of my invention.

Figure 2 is a side elevational view; and

Figure 3 is a vertical sectional view at line 3—3 of Figure 2.

Referring now to the drawings wherein I have illustrated the preferred form of the present embodiment of my invention, I have shown a grain drill of conventional construction including the inclined discs 2 and 4 secured on the axle 6 in the frame 8 including the cover or shield 10. In the ear 12 of the cover 10 there is supported the beams 14 for attachment to the conventional draft unit.

An auxiliary beam comprising the arms 16 and 17 is pivotally secured at 18 to the beam 14 and the rear angular end portions 20 and 22 of the arms form forks for the axle 24 of the packing and depth control disc or wheel 26.

Near the rear of the arms 16 and 17 there is provided a cross strap 28 which engages an angular bracket 30. The bracket 30 is provided with a series of openings 32, and the bracket 30 is slidably arranged in the flanges 34 on the rear of the frame 8.

A bolt 36 secured by nut 38 retains the bracket in adjusted position with relation to the frame 8. By adjusting the bracket 30, the discs 2 and 4 of the grain drill will be permitted to penetrate the soil only to the selected depth. The disk 26 being heavy and of relatively wide track surface will ride the surface of the soil effecting a stable guide for adjustment of the drill.

Cross straps 40 for the arms 16 and 17 stabilize the arms and prevent movement thereof.

Having thus fully described my invention what I claim as new and desire to secure by Letters Patent is:

In combination, a frame, a grain drill comprising a disc journaled in said frame and adapted to penetrate the ground, forwardly extending beam means connected to said frame and adapted to be attached to draft means, a pair of rearwardly extending arms each having the forward end thereof pivoted to said beam means, the rear ends of said arms journaling a packing and depth control wheel rearwardly of and in alignment with said disc, a cross strap on said arms located between said wheel and disc, an L-shaped bracket engaged by said cross strap, a channel-shaped guide mounted on the rear of said frame slidably receiving said bracket, and bolt means adjustably securing said bracket in said guide to regulate the depth of penetration of the disc.

NELS SANDBERG.

REFERENCES CITED

The following references are of record in the file of this patent:

UNITED STATES PATENTS

| Number | Name | Date |
|---|---|---|
| 90,200 | Shepherd | May 18, 1869 |
| 376,089 | Harter | Jan. 10, 1888 |
| 404,108 | Patric et al. | May 28, 1889 |
| 496,566 | Hobby | May 2, 1893 |

OTHER REFERENCES

Ser. No. 254,631, Visart (A. P. C.), published May 11, 1943.